United States Patent
Nelson

(10) Patent No.: US 9,446,807 B2
(45) Date of Patent: Sep. 20, 2016

(54) SEAT POST ASSEMBLY WITH TILT MECHANISM

(71) Applicant: ENVE Composites, LLC, Ogden, UT (US)

(72) Inventor: Kevin Nelson, Uintah, UT (US)

(73) Assignee: ENVE Composites, LLC, Ogden, UT (US)

(*) Notice: Subject to any disclaimer, the term of this patent is extended or adjusted under 35 U.S.C. 154(b) by 132 days.

(21) Appl. No.: 14/187,962

(22) Filed: Feb. 24, 2014

(65) Prior Publication Data
US 2015/0239516 A1    Aug. 27, 2015

(51) Int. Cl.
*B62J 1/08*    (2006.01)
*B62K 19/16*    (2006.01)

(52) U.S. Cl.
CPC ............... *B62J 1/08* (2013.01); *B62K 19/16* (2013.01); *Y10T 29/49826* (2015.01)

(58) Field of Classification Search
CPC .............. B62J 1/08; B62J 1/10; B62K 19/16
USPC .................................................... 297/215.15
See application file for complete search history.

(56) References Cited

U.S. PATENT DOCUMENTS

| | | | |
|---|---|---|---|
| 3,891,333 A | 6/1975 | Corderac'k | |
| 5,466,042 A * | 11/1995 | Herman | 297/215.15 |
| 5,501,506 A | 3/1996 | Kao | |
| 5,749,622 A * | 5/1998 | Tseng | B62J 1/08 297/195.1 |
| 7,621,595 B1 * | 11/2009 | Chen | 297/215.15 |
| 8,540,268 B1 * | 9/2013 | Soucek | 280/281.1 |
| 8,764,106 B2 * | 7/2014 | Bigolin | 297/215.14 |
| 2009/0218857 A1 | 9/2009 | Ochendalski | |
| 2011/0163515 A1 | 7/2011 | Cusack | |
| 2011/0210231 A1 * | 9/2011 | D'Aluisio | B62J 1/02 248/629 |
| 2013/0113242 A1 | 5/2013 | Connors | |
| 2013/0119719 A1 | 5/2013 | Bigolin | |
| 2013/0207424 A1 | 8/2013 | Choi | |

OTHER PUBLICATIONS

Seat Posts, ENVE Road Bike & Mountain Bike Seat Post/Carbon Fiber Seat Post [online], [retrieved on Feb. 24, 2014]. Retrieved from the internet <URL: http://www.enve.com/seatposts.aspx>.

* cited by examiner

*Primary Examiner* — Milton Nelson, Jr.
(74) *Attorney, Agent, or Firm* — Woodard Emhardt Moriarty McNett and Henry LLP

(57) ABSTRACT

A bicycle seat post assembly includes a seat post that has a barrel, a cradle assembly, and a tilt mechanism. The cradle assembly is received in the barrel to secure a saddle to the seat post. The tilt mechanism is received in the barrel for setting saddle tilt. The tilt mechanism has at least one expander configured to at least expand. The expander is positioned in the barrel to exert a torque on the cradle assembly during expansion that causes the cradle assembly to rotate.

34 Claims, 12 Drawing Sheets

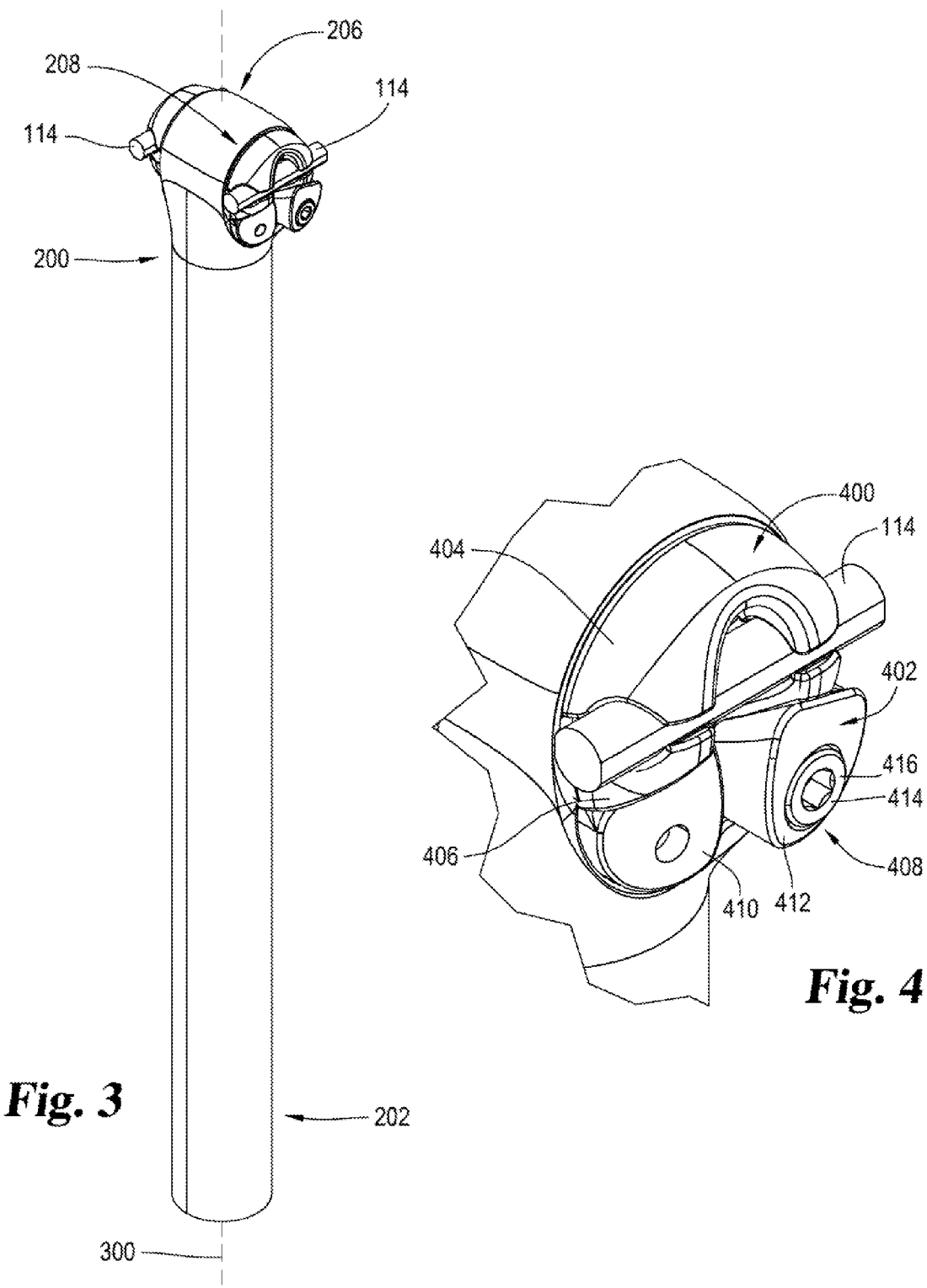

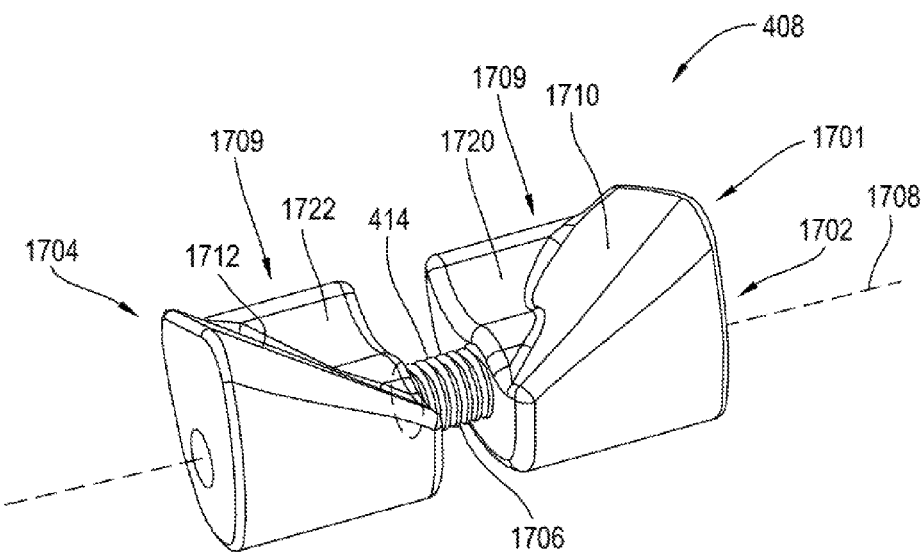
Fig. 17
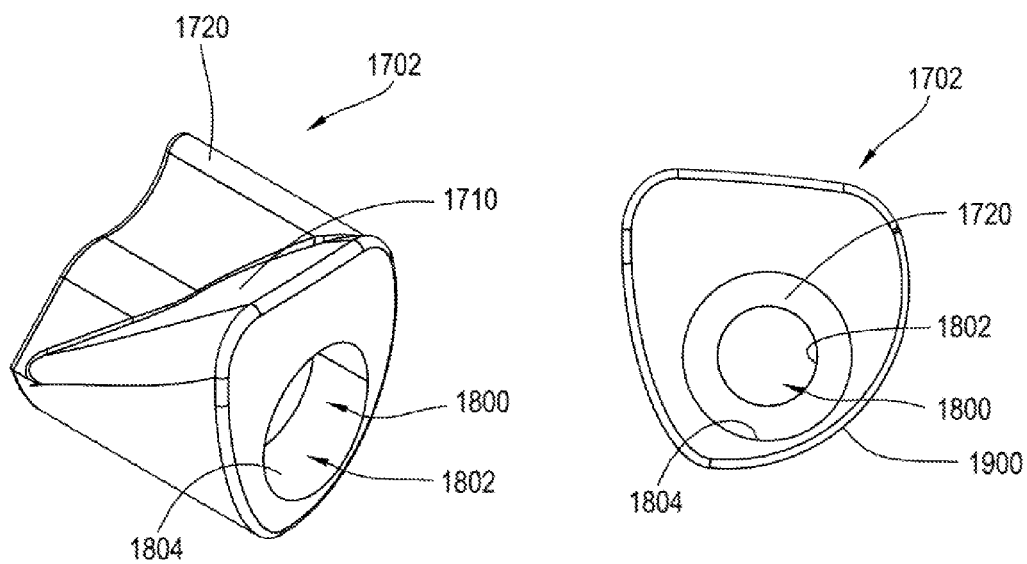
Fig. 18   Fig. 19

SEAT POST ASSEMBLY WITH TILT MECHANISM

BACKGROUND

The present disclosure pertains generally to devices and assemblies for adjustably coupling a saddle to a bicycle frame. Existing arrangements for adjusting the position and/or tilt of a bicycle saddle are available; however, many require a friction fit that has been found to slip under the weight of the bicycle rider over time. Additionally, many existing adjustment arrangements require separate tools for adjustment of the fore and aft position of the saddle and the saddle angle relative to the seat post. Thus, there is a need for improvement in this field.

SUMMARY

For competitive bicycle racers and enthusiasts, the position or orientation of the saddle relative to the pedals can be a concern for both comfort as well as performance. If the saddle is not properly positioned, the rider might not be able to obtain the leverage necessary to optimally crank the pedals and/or may lead to discomfort on extended rides. Moreover, competitive bicycle racing organizations typically have regulations that define the maximum tolerances for positioning the saddle. For instance if the saddle is tilted too far in one direction, the rider may fail inspection and be disqualified. To improve performance, many modern bicycle components are made of fiber reinforced materials, such as carbon fiber materials, in order to provide high strength while at the same time being light weight. While they provide a number of advantages, fiber reinforced materials still create a number of design challenges. Typically, carbon fiber and other fiber reinforced materials have high tensile strength but low compressive strength. Traditional seat adjustment mechanisms that apply compressive loads to the seat post in order to adjust saddle tilt as well as lock saddle position are unsuitable for seat posts made of fiber reinforced materials because the compressive loads can lead to premature and/or catastrophic failure of the seat post. Current carbon fiber seat adjustment mechanisms also typically rely on frictional forces to lock the saddle tilt. Carbon fiber and other fiber reinforced material seat posts generally have low coefficients of friction such that seat adjustment mechanisms relying on friction tend to slip thereby causing the saddle tilt to change over time. This can lead to disastrous consequences. For example, a rider can lose power over time as the saddle tilt changes. For competitive riders, a saddle that may have passed inspection before the race may fail inspection at the conclusion of the race due to this saddle slippage during the course of a race. Further compounding the situation, some components in the seat adjustment mechanism may require grease. Saddle slippage can also result if a part is improperly greased and/or if the grease spreads so as to contaminate other components. Fine tuning saddle tilt with these frictional type seat adjustment mechanisms can be extremely difficult. The forces applied by torque wrenches and the like to lock in the saddle tilt can cause the saddle to slip from the desired angle. The repeated adjustments required to achieve the desired saddle tilt can be quite frustrating to a rider and/or mechanic.

A unique saddle tilt mechanism, which will be described in greater detail below, has been developed to address these as well as other issues. The tilt mechanism relies on applying a resulting tensile force to a barrel formed in a seat post through expansion. The resulting outer radial forces used to lock the position of the saddle create a net tensile force on the barrel of the seat post. The net tensile force is desirable for seat post made of fiber reinforced materials, such as carbon fiber materials, but it should be recognized that this design can be incorporated into seat posts made of other materials. The tilt mechanism does not rely upon frictional forces to lock the saddle tilt. Instead, an interference fit is created between the adjustment mechanism, cradle assembly, and the barrel of the seat post so as to lock the position of the saddle. By using an interference fit, the issues created by grease are reduced because the assembly is not relying on friction to lock the saddle tilt. One or more of the expanders in the tilt mechanism are offset relative to the central rotational axis of the cradle assembly to impart a torque to the cradle assembly when expanded in order to rotate the cradle assembly so as to adjust saddle tilt. To provide fine tuning of the saddle tilt, the tilt mechanism includes at least two expanders that are configured to expand and contract in an alternating manner within the barrel to apply compressive forces against the cradle assembly. The expanders are configured to exert counter rotational forces or torques against the cradle assembly, thereby enabling the fine tuning adjustment of saddle tilt. During tilt adjustment, one of the expanders is expanded and the other expander is contracted, either at the same time or in a sequential fashion, so as to create the desired torque to tilt the saddle. Using this alternating or reciprocating expansion-contraction approach reduces the risk of over adjustment. For example, if one of the expanders is expanded too far, the other expander acts like a stop to counteract or prevent any over adjustments in saddle tilt. The same force used to secure the saddle tilt also locks the saddle position in place at the same time. With this design, the saddle tilt can be adjusted without the need of the mechanic to hold the saddle at the desired saddle tilt angle.

Current seat adjustment mechanism designs place considerable stress on the bolts that are used to adjust saddle tilt and any resulting bolt failures can lead to catastrophic failures of the entire seat adjustment mechanism. As will be appreciated from the discussion below, the seat post assembly described herein dramatically reduces bolt stress. In addition, if any bolt or other failures do occur, the barrel contains and generally holds in place the components of the seat post assembly, thereby avoiding a catastrophic failure.

The seat post assembly as described and illustrated herein concerns a number of unique and inventive aspects. Some, but by no means all, of these unique aspects are summarized below.

Aspect 1 concerns an apparatus, comprising: a seat post having a barrel; a cradle assembly received in the barrel to secure a saddle to the seat post; and a tilt mechanism received in the barrel for setting saddle tilt, the tilt mechanism having at least one expander configured to at least expand, wherein the expander is positioned in the barrel to exert a torque on the cradle assembly during expansion that causes the cradle assembly to rotate.

Aspect 2 concerns the apparatus as in any preceding aspect, wherein the tilt mechanism includes at least two expanders positioned in the barrel to apply counteracting torques to the cradle assembly.

Aspect 3 concerns the apparatus of aspect 2, wherein the expanders are configured to expand and contract in a complementary manner to adjust saddle tilt.

Aspect 4 concerns the apparatus as in any preceding aspect, wherein the cradle assembly has an alignment structure that inhibits lateral movement of the cradle assembly relative to the seat post while allowing rotational movement of the cradle assembly.

Aspect 5 concerns the apparatus as in aspect 4, wherein the alignment structure includes a semi-circular groove defined in the cradle assembly.

Aspect 6 concerns the apparatus as in any preceding aspect, wherein the cradle assembly is configured to set the saddle position of the saddle when the expander is expanded.

Aspect 7 concerns the apparatus as in any preceding aspect, further comprising: the cradle assembly including a barrel engagement cradle contacting the barrel and a tilt mechanism engagement cradle contacting the tilt mechanism; and wherein the tilt mechanism is configured to apply pressure to the tilt mechanism engagement cradle to clamp one or more rails of the saddle between the barrel engagement cradle and the tilt mechanism engagement cradle.

Aspect 8 concerns the apparatus of aspect 7, wherein the barrel engagement cradle includes a tongue and the tilt mechanism engagement cradle includes a groove in which the tongue is received for aligning the barrel engagement cradle with the tilt mechanism engagement cradle.

Aspect 9 concerns the apparatus as in any preceding aspect, wherein the cradle assembly and the tilt mechanism have opposing ramp portions arranged to slidably engage with one another.

Aspect 10 concerns the apparatus of aspect 9, wherein the opposing ramp portions have an angle from 30 to 35 degrees.

Aspect 11 concerns the apparatus as in any preceding aspect, wherein the expander includes a wedge assembly, the wedge assembly including at least two wedges connected together with an adjustment mechanism configured to adjust the relative positions of the at least two wedges.

Aspect 12 concerns the apparatus as in any preceding aspect, further comprising a keying structure configured to prevent rotation of the tilt mechanism relative to the barrel.

Aspect 13 concerns the apparatus of aspect 12, wherein the keying structure includes a lobe cavity defined in the barrel in which the expander is received.

Aspect 14 concerns the apparatus of aspect 13, wherein the expander and the lobe cavity have curved contacting surfaces configured to facilitate rotation of the expander within the lobe cavity.

Aspect 15 concerns the apparatus as in any one of aspects 12, 13, or 14, wherein the keying structure is offset in a circumferential direction relative to a longitudinal axis of the seat post.

Aspect 16 concerns the apparatus as in any preceding aspect, wherein the tilt mechanism creates an interference fit with the cradle assembly and the barrel when the saddle tilt is set.

Aspect 17 concerns the apparatus as in any preceding aspect, wherein: at least the barrel of the seat post is made of fiber reinforced material wrapped around the barrel; and the expander places the fiber reinforced material of the barrel under tension when the saddle tilt is set. Aspect 18 concerns the apparatus as in aspect 17, wherein the fiber reinforced material includes carbon fiber material.

Aspect 19 concerns the apparatus as in any preceding aspect, wherein the expander is positioned to apply a force to the cradle assembly that is offset relative to an axis about which the cradle assembly rotates.

Aspect 20 concerns the apparatus as in any preceding aspect, wherein the expander is further configured to contract.

Aspect 21 concerns a method, comprising: coupling a saddle to a cradle assembly, wherein the cradle assembly is received inside a barrel of a seat post; and changing saddle tilt of the saddle by expanding at least one expander inside the barrel to exert a torque on the cradle assembly.

Aspect 22 concerns the method of aspect 21, wherein changing the saddle tilt includes contracting a second expander in the barrel positioned to apply a counter torque to the cradle assembly.

Aspect 23 concerns the method as in any one of aspects 21 or 22, wherein changing the saddle tilt includes: positioning the saddle at the desired saddle tilt; and expanding the expander while holding the saddle at the desired saddle tilt.

Aspect 24 concerns the method as in any one of aspects 21, 22, or 23, further comprising setting the saddle position by expanding the expander so that the cradle assembly clamps to one or more rails of the saddle.

Aspect 25 concerns a method of manufacturing, assembling, and/or operating the apparatus of any preceding aspect.

Further forms, objects, features, aspects, benefits, advantages, and embodiments of the present invention will become apparent from a detailed description and drawings provided herewith.

BRIEF DESCRIPTION OF THE DRAWINGS

FIG. 3 is perspective view of a seat post assembly.
FIG. 4 is an enlarged view of the saddle attachment region of the seat post assembly of FIG. 3.
FIG. 17 is a perspective view of an exemplary wedge assembly.
FIG. 18 is a perspective view of an exemplary first wedge.
FIG. 19 is a right side view of the wedge of FIG. 18.

DESCRIPTION OF THE SELECTED EMBODIMENTS

Figure 1:
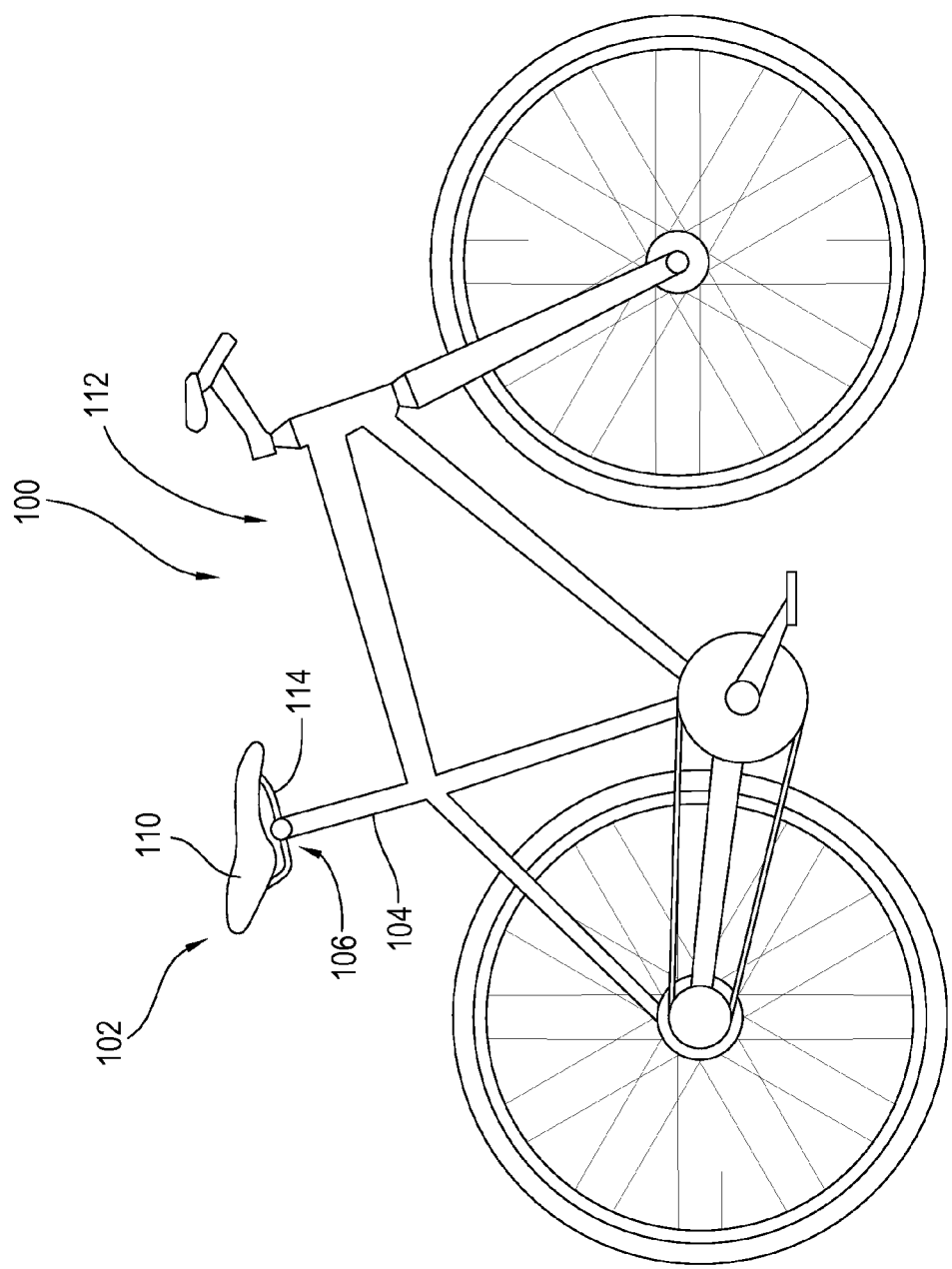
FIG. 1 is a side view of a bicycle.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "200" series reference numeral will likely first appear in FIG. 2, and so on.

Seat Adjustment Mechanism

FIG. 1 illustrates a side view of a bicycle 100 having an exemplary seat post assembly 102. The seat post assembly includes an elongate seat post 104 and an adjustment assembly 106 coupled thereto. As will be appreciated, the seat post assembly is arranged and useful for adjustably coupling a saddle 110 to a frame 112 of the bicycle. For example, when attached to the frame of the bicycle and the saddle, a bicycle rider can adjust the seat post assembly so as to attain a desired saddle height, saddle position, and/or saddle tilt.

Figure 2:
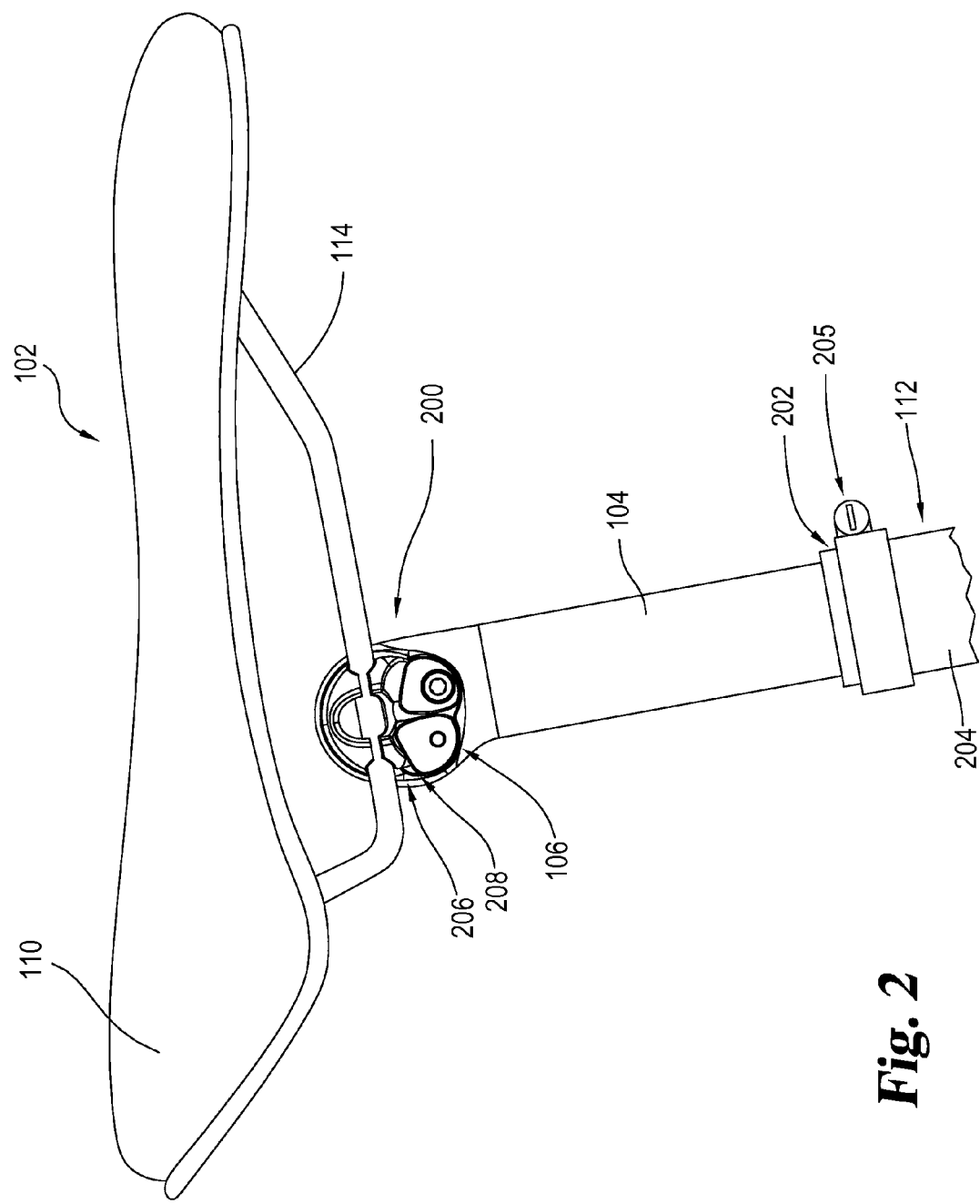
FIG. 2 is an enlarged view of a portion of the bicycle of FIG. 1.

As shown in FIGS. 2 and 3, the seat post has a saddle attachment region 200 where the saddle is attached and a frame attachment region 202 that is received within a seat tube 204 of the bicycle frame and secured by a seat post clamp 205. As depicted, the seat tube 204 extends along a longitudinal axis 300. The saddle attachment region has a barrel 206 that defines a cavity 208 in which the adjustment assembly 106 is received. The adjustment assembly is arranged to engage one or more rails 114 of the saddle so as to couple the saddle to the seat post. The frame attachment region of the seat post is arranged for slidable receipt within an inside cavity of the seat tube of the frame of the bicycle so that saddle height may be adjusted by the bicycle rider and/or mechanic.

Figure 5:
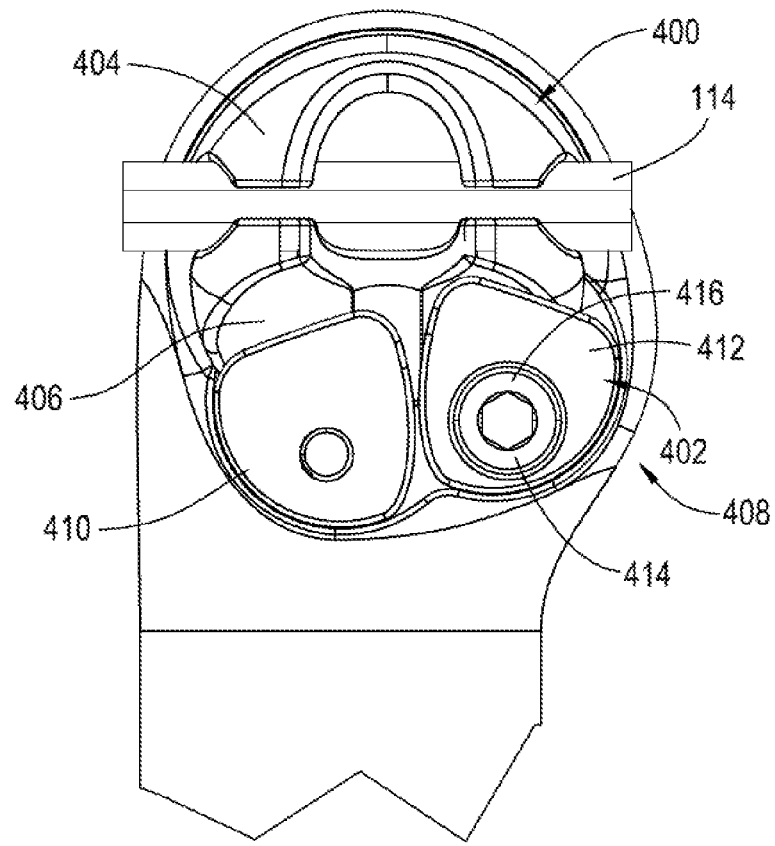
FIG. 5 is a side view of the saddle attachment region of the seat post assembly of FIG. 3.
Figure 6:
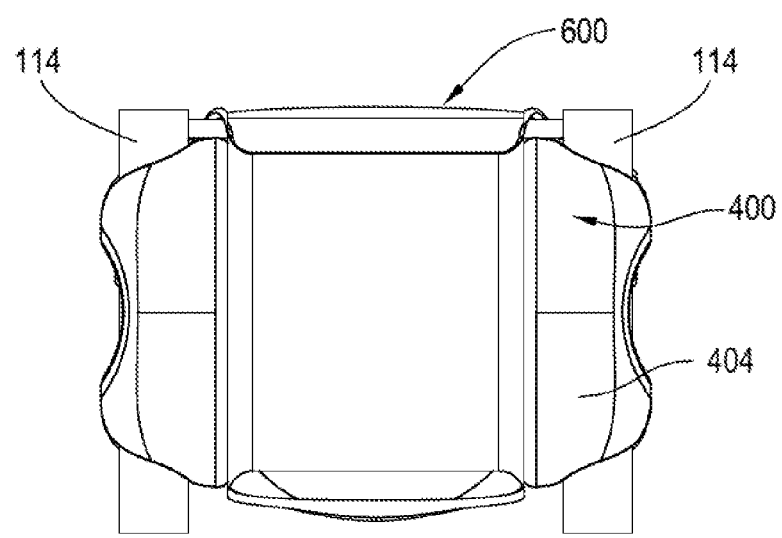
FIG. 6 is a top view of the seat post assembly of FIG. 3.

Turning now to FIGS. 4, 5, and 6, the adjustment assembly includes a cradle assembly 400 and a tilt mechanism 402. The cradle assembly, as will be described in more detail below, is arranged to receive one or more rails of the saddle and allow for the slidable adjustment of the saddle (e.g., saddle position). As shown, the cradle assembly includes a barrel engagement cradle 404 and a tilt mechanism engagement cradle 406 in between which the rails of the saddle are clamped. The tilt mechanism is arranged to exert compressive force against the wall portion of the cavity and the cradle assembly so as to cause an interference fit between the cradle assembly and the cavity. As noted before, by using an interference fit rather than a frictional engagement, the risk of saddle tilt slippage is reduced even when grease is present on some or all of the parts. The tilt mechanism secures the cradle assembly at a desired angular orientation relative to the longitudinal axis 300 (FIG. 3) of the seat post. Additionally, the tilt mechanism, in some embodiments, can be arranged to apply a force to the cradle assembly so as to increase the frictional resistance and/or cause an interference fit between the rails of the saddle and the cradle assembly so as to prevent sliding movement of the rails relative to the cradle assembly. In the illustrated embodiment, the tilt mechanism applies a compressive force to the cradle assembly which in turn clamps the cradle assembly with the rails of the saddle so as to lock the saddle position.

Looking at FIGS. 4 and 5, the tilt mechanism includes at least two expanders 408, a first expander 410 and a second expander 412, that are configured to expand and contract in an alternating or reciprocating fashion to adjust saddle tilt. As can be seen, the expanders are positioned in the barrel to exert a torque on the cradle assembly during expansion which in turn causes the cradle assembly to rotate. In particular, each expander is positioned to apply a force to the cradle assembly that is offset relative to an axis about which the cradle assembly rotates. In other words, the resulting force vector created by expanding the expander is offset from the central axis of rotation of the cradle assembly. Each expander includes a screw 414 with a head 416 that is turned to either expand or contract the expander. As will be described in greater detail below in the Definitions and Alternatives section, the term "expand" (and variations thereof) generally means to increase in size so that all or part of something becomes bigger in at least one dimension or direction. For instance, even though the wedges for the expanders in one example are brought closer together so as to contract laterally, the wedge assemblies described below are considered to expand because the operative part of the wedges pressing against the cradle assembly have a thicker profile in a radial or vertical direction so as to apply more force to the cradle assembly. In contrast, the term "contract" (and variations thereof) generally means to decrease in size so that all or part of something becomes smaller in at least one dimension or direction. For instance, even though the wedges for the expanders in one example are spread apart from one another so as to expand laterally, the wedge assemblies described below are considered to contract because the operative part of the wedges pressing against the cradle assembly have a thinner profile in a radial or vertical direction so as to apply less force to the cradle assembly. In the illustrated embodiment, the first and second expanders are generally identical but are oriented in an opposite fashion when installed together such that the heads of the screws are accessible from opposite sides of the tilt mechanism. Referring to FIG. 5, when the screw of the first expander is loosened to contract the first expander and the screw of the second expander is tightened to expand the second expander, the cradle assembly rotates in a counter-clockwise direction so as to tilt the nose of the saddle in a downward direction. Conversely, when the screw of the first expander is tightened to expand the first expander and the screw of the second expander is loosened to contract the second expander, the cradle assembly rotates in a clockwise direction so as to tilt the nose of the saddle in an upward direction.

Figure 7:
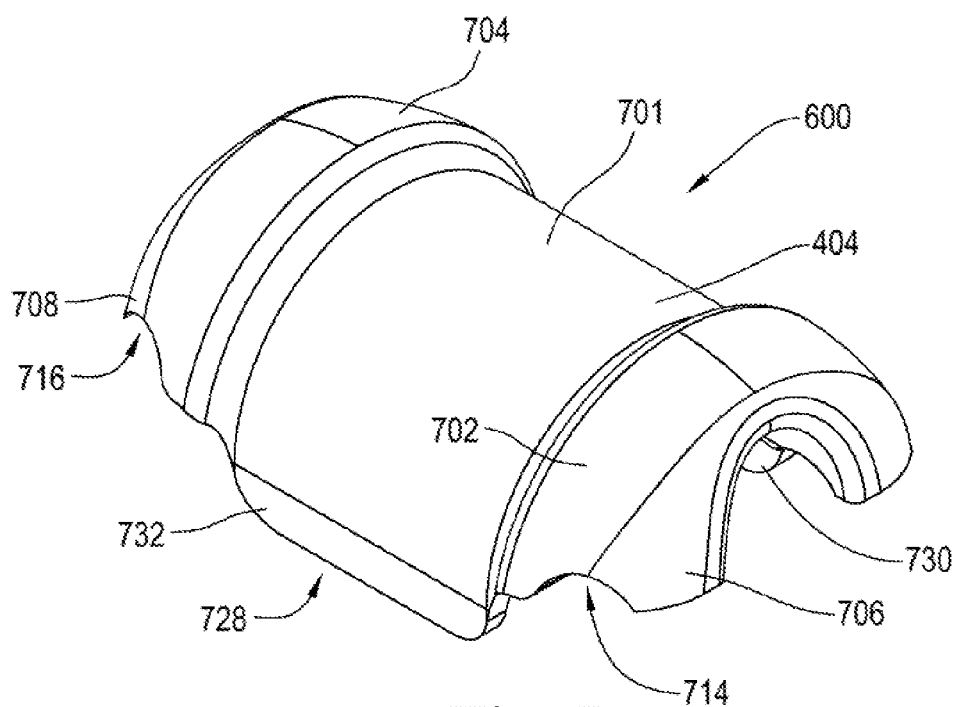
FIG. 7 is a top perspective view of an exemplary barrel engagement cradle.
Figure 8:
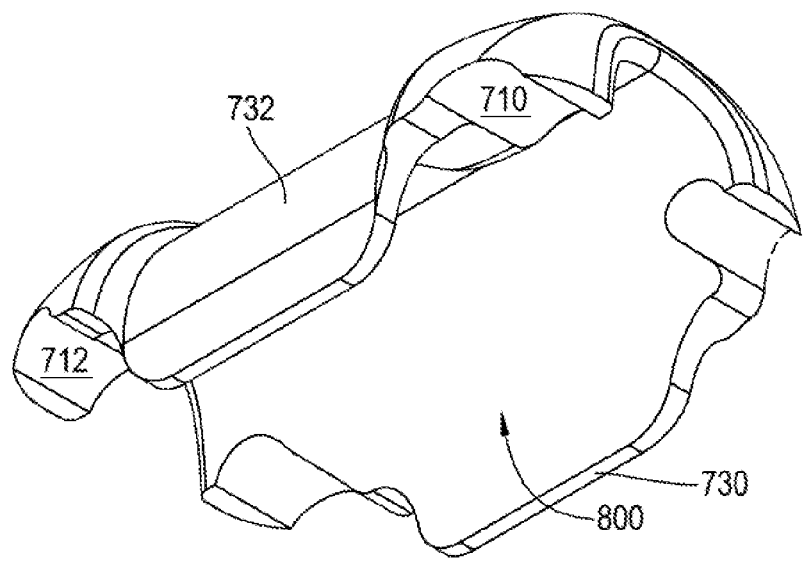
FIG. 8 is a bottom perspective view of the cradle of FIG. 7.
Figure 9:
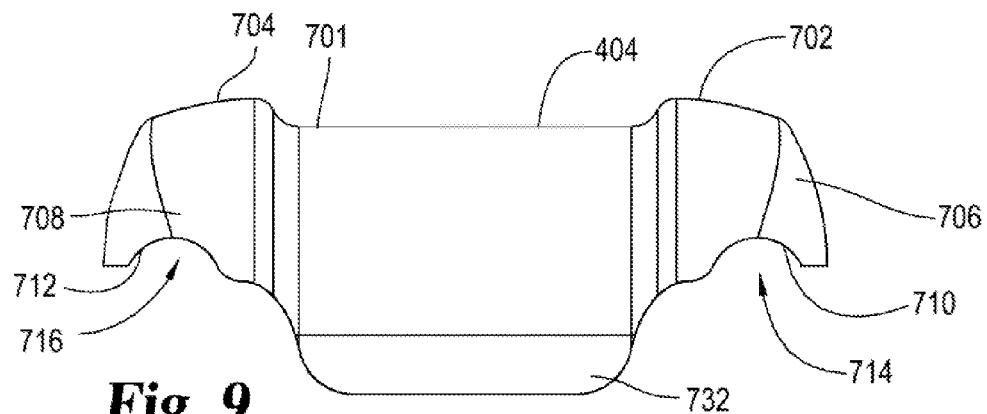
FIG. 9 is a front view of the cradle of FIG. 7.
Figure 10:
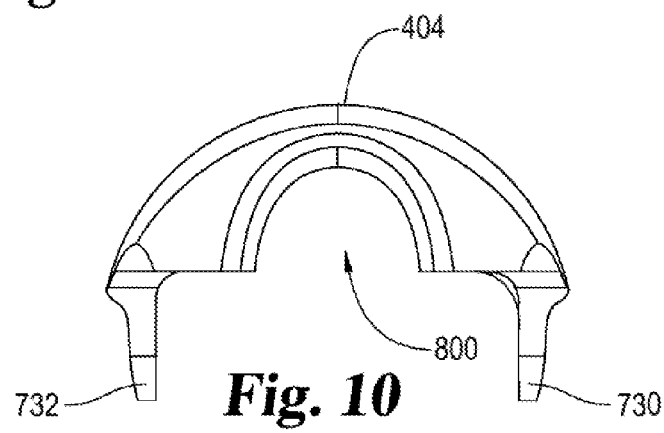
FIG. 10 is a side view of the cradle of FIG. 7.
Figure 11:
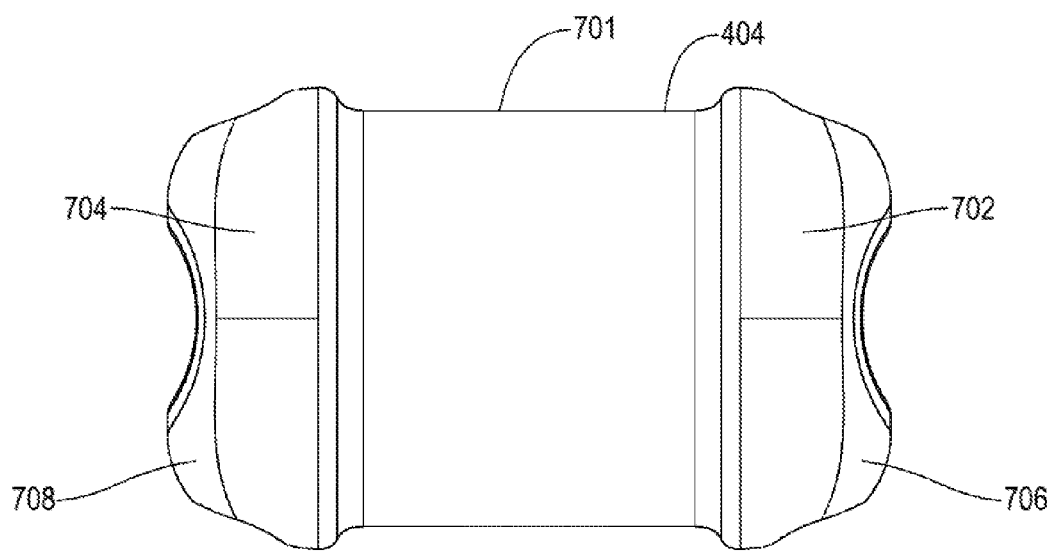
FIG. 11 is a top view of the cradle of FIG. 7.

In some instances, such as depicted in FIGS. 6 and 7, the cradle assembly can include an alignment structure 600 arranged to inhibit lateral movement of the cradle assembly relative to the seat post while allowing rotational movement of the cradle assembly. For example, the alignment structure in one example includes an alignment groove 701 in the barrel engagement cradle that is positioned between opposing raised portions 702, 704, as is shown in FIGS. 7, 8, 9, and 11. The alignment groove in the barrel engagement cradle extends in a circumferential direction and has a semi-cylindrical shape to facilitate rotational movement. A portion of the barrel of the seat post is received in the alignment groove with the raised portions situated on opposite sides of the barrel (FIG. 6). The recessed portion aids in centering the barrel engagement cradle within the cavity of the seat post and preventing the cradle assembly from sliding out of the cavity during assembly, saddle location, and use.

Looking at FIG. 7, the barrel engagement cradle also includes rail engaging portions 706, 708 that are configured to engage the rails of the saddle. In the illustrated embodiment, the rail engaging portions have rail contacting surfaces 710, 712 that define rail receiving recesses 714, 716. The rail receiving recesses are arranged to receive and engage at least a portion of the rail of the saddle. In several embodiments, the rail engaging portions of the cradles cooperate to compress the rail between the barrel engagement cradle and the tilt mechanism engagement cradle.

As is shown in FIGS. 7, 8, 9, and 10, the barrel engagement cradle can also have one or more cradle alignment structures or portions 728. The cradle alignment structures are configured to properly align the barrel engagement cradle with the tilt mechanism engagement cradle during assembly as well as maintain the alignment during use. For instance, the cradle alignment structures can align the barrel engagement cradle and tilt mechanism engagement cradle in the lateral and/or fore-aft directions. The alignment structures can further assist in transmitting torque between the cradles when saddle tilt is adjusted. In the illustrated example, the alignment structure includes a first tongue 730 and a second tongue 732 extending from the barrel engagement cradle that align the cradles both in the lateral and fore-aft directions. Moreover, the tongues act as braces to evenly distribute the load on the barrel as the expanders are expanded to lock the cradle assembly in place. When the expanders are expanded, the barrel tends to stretch which in turn causes the sides of the barrel to compress in an inwards direction. If left unaddressed, the resulting point load with high stress could lead to failure of the barrel. The tongues resist the compressive loads at the sides of the barrel, thereby more evenly distributing the loads so as to reduce high stresses in the barrel. In the depicted embodiment, the barrel engagement cradle has a cavity 800 to reduce the weight of the adjustment assembly as well as to allow room for the lower cradle to maneuver during assembly.

Figure 12:
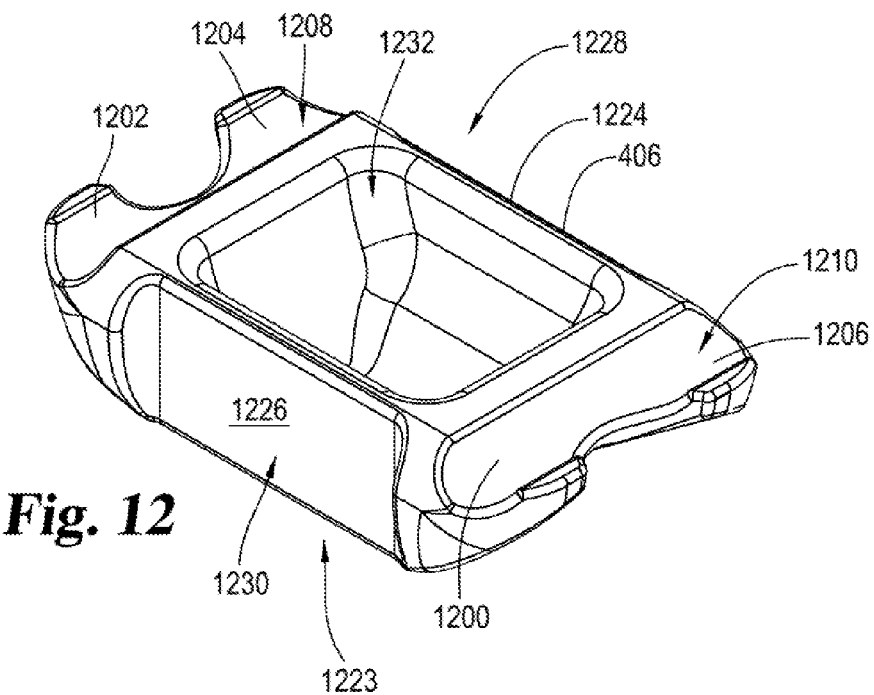
FIG. 12 is a perspective view of an exemplary tilt mechanism engagement cradle.
Figure 15:
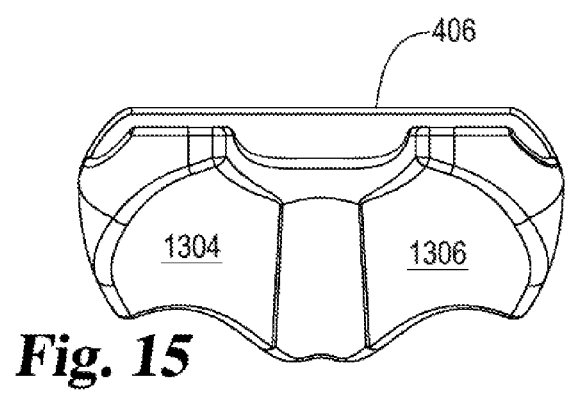
FIG. 15 is a side view of the cradle of FIG. 11.
Figure 16:
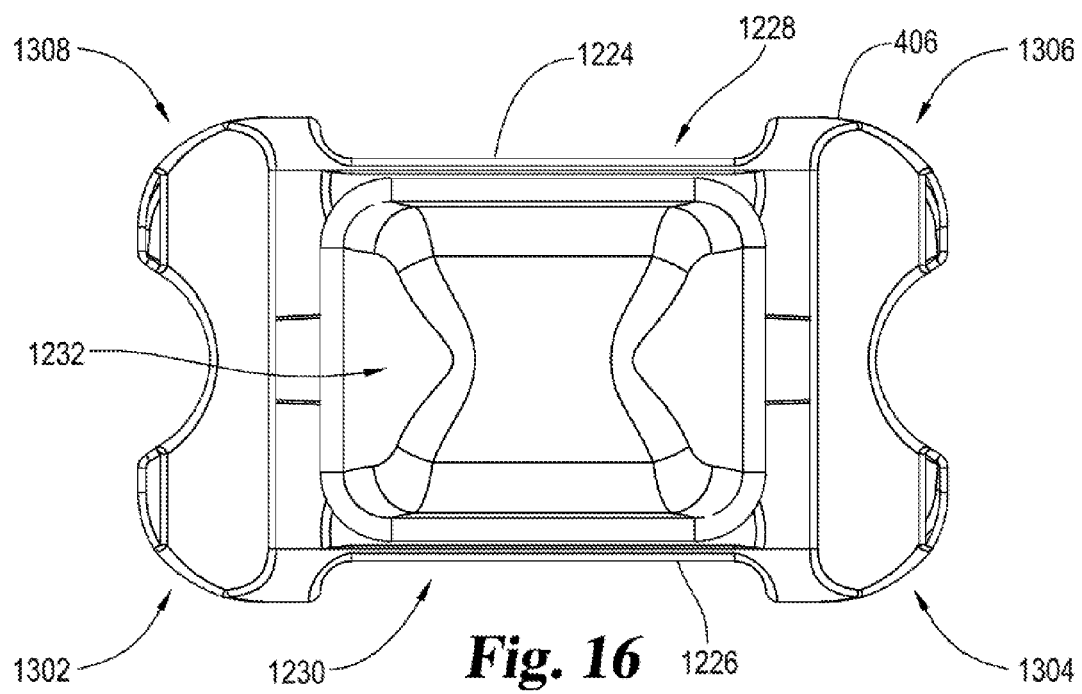
FIG. 16 is a top view of the cradle of FIG. 11.

The tilt mechanism engagement cradle 406 will now be discussed with reference to FIGS. 12, 13, 14, 15, and 16. As can be seen, the tilt mechanism engagement cradle has many features complementary to features discussed above with respect to the barrel engagement cradle. For example, the tilt mechanism engagement cradle includes rail engaging portions 1200, 1202 having rail contacting surfaces 1204, 1206 that define rail receiving recesses 1208, 1210 arranged to receive and engage at least a portion of the rail of the saddle. In the illustrated embodiment, the rails of the saddles are clamped inside the rail recesses of both cradles in order to set the saddle position. As another example, the tilt mechanism engagement cradle can have one or more cradle alignment portions or structures 1223 arranged to cooperate with the cradle alignment portion(s) of the barrel engagement cradle. For example, the tilt mechanism engagement cradle can have a first surface 1224 and a second surface 1226 arranged to contact the first and second tongues of the barrel engagement cradle, respectively, so that the cradles align with one another when brought into a mating engagement. In the illustrated example, one or more of the first and second surfaces of the tilt mechanism engagement cradle define alignment recesses 1228, 1230 configured to receive the respective tongue of the barrel engagement cradle. When the tongues are received in the alignment recesses, lateral and fore-aft movement of the cradles relative to one another is minimized, and torque transfer between the cradles is enhanced during saddle tilt adjustment. As depicted in FIGS. 12 and 16, the tilt mechanism engagement cradle defines an internal cavity 1232 that, among other things, reduces the overall weight of the tilt mechanism engagement cradle.

Figure 13:
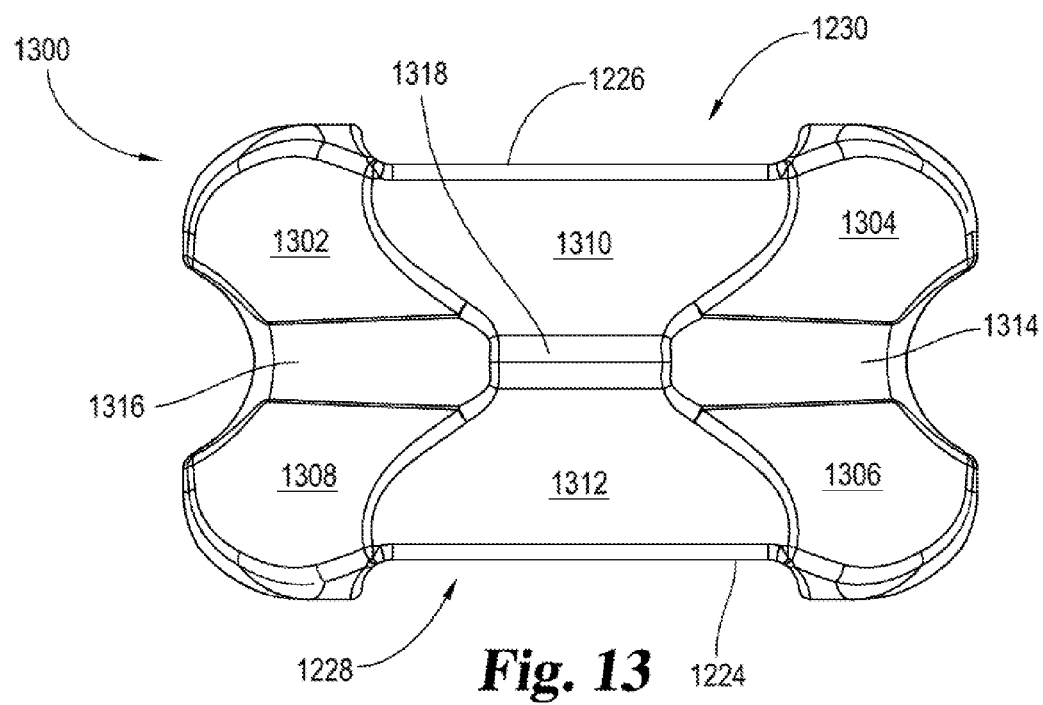
FIG. 13 is a bottom view of the cradle of FIG. 12.
Figure 14:
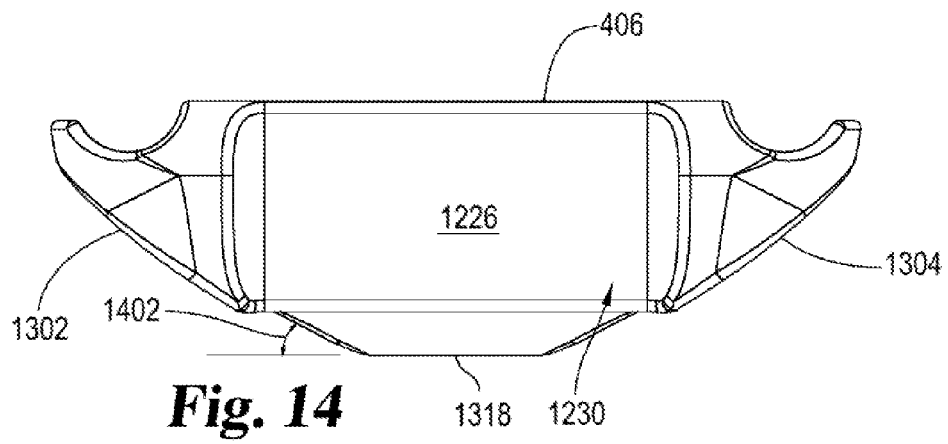
FIG. 14 is a front view of the cradle of FIG. 11.

FIG. 13 shows a bottom view of the tilt mechanism engagement cradle. The tilt mechanism engagement cradle has a tilt mechanism contacting surface 1300. The tilt mechanism contacting surface has several portions shaped to facilitate saddle tilt adjustments. As shown in FIGS. 13 and 15, the tilt mechanism contacting surface has ramp portions 1302, 1304, 1306, and 1308 located at the corners of the tilt mechanism engagement cradle. As can be seen in FIG. 15, the ramp portions have a slight concave curve that aids with centering and aligning with the tilt mechanism. Between the ramp portions, the tilt mechanism contacting surface has connecting portions 1310, 1312 and lateral portions 1314, 1316 extending between the ramp portions. The connecting and lateral portions are joined together via a ridge 1318. The tilt mechanism contacting surface generally forms an overall convex shape that facilitates centering of the cradle, such as during assembly and saddle tilt adjustments. Looking at FIG. 14, the ramp portions form an engagement angle 1402 relative to the ridge. It was unexpectedly discovered that having the engagement angle from 30 to 35 degrees, and more specifically 33 degrees, facilitated smooth sliding between the components and minimized the risk of binding. It should be appreciated that the complementary surfaces of the expanders can have similar angles. In addition, the overall convex or generally frustum shape of the tilt mechanism contacting surface facilitates rotation of the cradle assembly during saddle tilt adjustments and minimizes the risk of seizing during saddle tilt adjustments.

Figure 22:
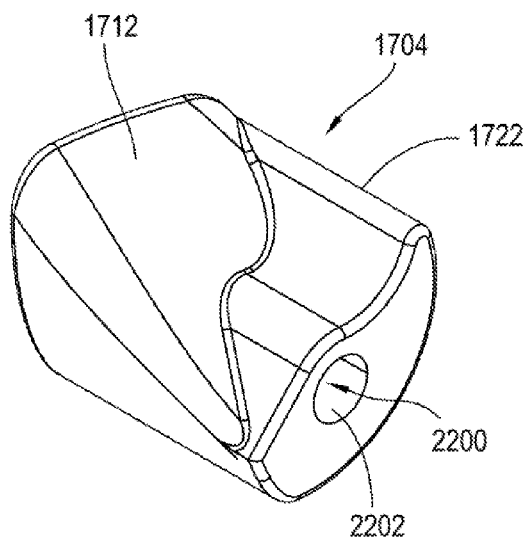
FIG. 22 is a perspective view of an exemplary second wedge.
Figure 23:
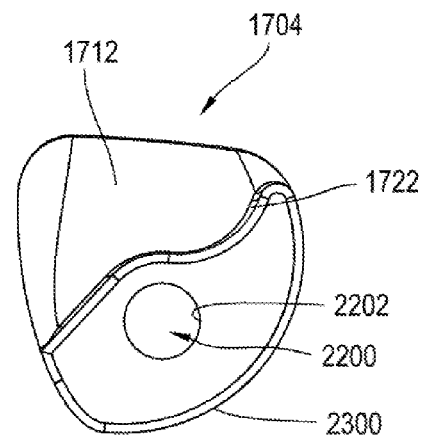
FIG. 23 is a right side view of the wedge of FIG. 22.
Figure 24:
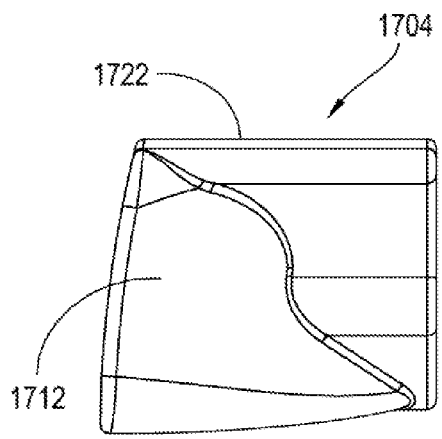
FIG. 24 is a top view of the wedge of FIG. 22.

FIG. 17 illustrates a perspective view of one of the expanders 408 that was initially described with respect to FIGS. 4 and 5. As noted above, the first and second expanders used in the tilt mechanism have the same design and are merely oriented differently when the tilt mechanism is assembled, so the description below applies to both the first and second expanders. In the illustrated embodiment, the expander is in the form of a wedge assembly 1701 that includes opposing wedges 1702, 1704 connected together through an advancement mechanism 1706, such as the screw 414 shown in FIG. 17. The advancement mechanism is used to move the wedges toward or away from another along a longitudinal axis 1708. With a few exceptions noted below, the wedges are generally shaped to be mirror images of one another. Each wedge has a cradle contacting surface 1709 with ramp portions 1710, 1712 and side portions 1720, 1722 arranged to slidably contact the tilt mechanism contacting surface 1300 of the cradle assembly. Referring to FIGS. 18, 20, 21, 22, 23, 24, and 25, the ramp portions form a wedge shape in which a thicker outer side or end of the wedge tapers to a thinner inner side of the wedge that faces the other wedge in the wedge assembly. As can be seen in FIGS. 21 and 24, the ramp portions can have a slight bulge to coincide with the concave shapes of the ramp portions of the tilt mechanism engagement cradle shown in FIG. 15. This configuration can create points of contact so as to better align the cradle assembly with the tilt mechanism. The side portions are arranged to provide lateral support to the wedge assembly (e.g., support along a direction transverse to the longitudinal axis of the wedge assembly) to hold the rotational orientation of the cradle assembly. When the tilt mechanism is assembled, the cradle contacting surfaces of the wedges engage the tilt mechanism contacting surfaces of the cradle assembly in a generally complementary manner so as to properly orient the cradle assembly. For instance, looking at FIGS. 14, 15, and 17, the tilt mechanism contacting surface 1300 of the cradle assembly has a generally convex shape that is designed to be received in the concave shape formed by the cradle contacting surfaces 1709 of the wedges.

During saddle tilt adjustments, the cradle contacting surface of the wedges slide along the tilt mechanism contacting surface of the cradle. When the adjustment assembly is positioned within the seat post, the tilt mechanism is adjustable so as to impart opposing rotational forces on the cradle assembly. For example, a first expander can be arranged to impart a clockwise rotational force and a second expander can be arranged to impart an opposing, counter-clockwise rotational force to the cradle assembly. In many instances, the vector of the force that an expander applies to the cradle assembly is substantially normal to a wall portion supporting the respective expander. In other words, when the screw is tightened on one of the wedge assemblies, the ramp portions of the wedges slide along the tilt mechanism contacting surfaces of the cradle assembly. In essence, the wedge assembly expands radially by the wider sections of the ramp portions contacting the cradle assembly so as to impart a greater compressive force against the cradle. When the screw for the other wedge assembly is loosened, the wedges spread apart such that the thinner sections of the ramp portions engage the wedge assembly. This action in essence contracts the wedge assembly in the radial direction such that the compressive force applied is less. The resulting imbalance between the compressive forces applied by the wedge assemblies causes the cradle assembly to rotate such that the saddle tilt is changed. Moreover, the resulting forces used to hold the saddle at the desired saddle tilt and/or position expand radially outwards relative to the barrel.

Figure 20:
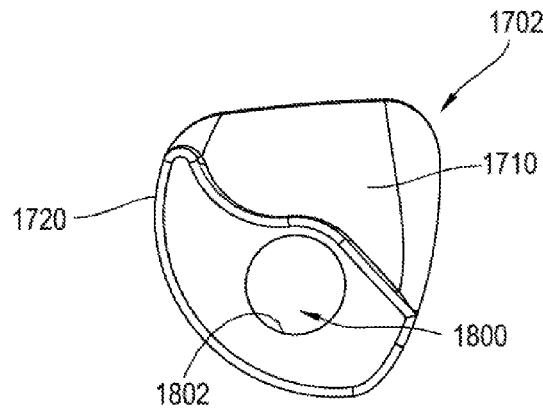
FIG. 20 is a left side view of the wedge of FIG. 18.
Figure 21:
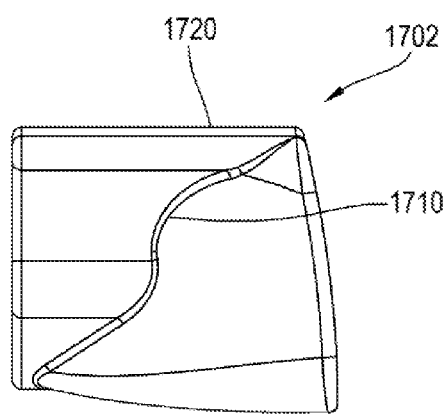
FIG. 21 is a top view of the wedge of FIG. 18.
Figure 25:
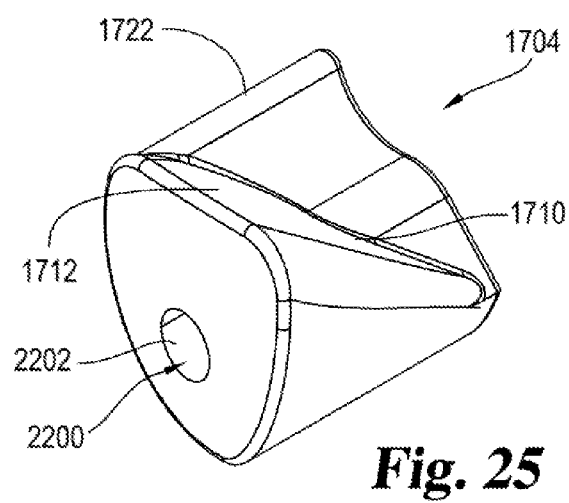
FIG. 25 is a perspective view of the wedge of FIG. 22.

Looking at FIGS. 18, 19, and 20, the screw used to couple the wedges to one another extends through a screw hole 1800 in the wedge. The screw hole has threading that engages the threads on the screw. To reduce the risk of injury or snags, the wedge has a counter bore 1802 with a counter bore surface 1804 in which the head of the screw is received. As shown in FIG. 19, the wedge has a lobe contacting surface 1900. In the illustrated embodiment, the lobe contacting surface has a curved or arcuate shape so as to coincide with a similarly shaped wedge receiving lobe cavity in the barrel which will be discussed in greater detail below with respect to FIGS. 26 and 27. With the lobe contacting surface having a curved shape, the wedge along with the rest of the wedge assembly is able to rotatably slide within the barrel during assembly as well as during saddle tilt adjustments so that the cradle contacting surfaces of the wedges properly face and engage the cradle assembly. Turning to FIGS. 22, 23, and 25, the other wedge has a screw hole 2200 with an internally threaded surface 2202 in which the screw is threaded. Like the previous wedge, the wedge in FIG. 23 has a lobe contacting surface 2300 that is curved to facilitate rotation of the wedge within the barrel during assembly and saddle tilt adjustments.

Figure 26:
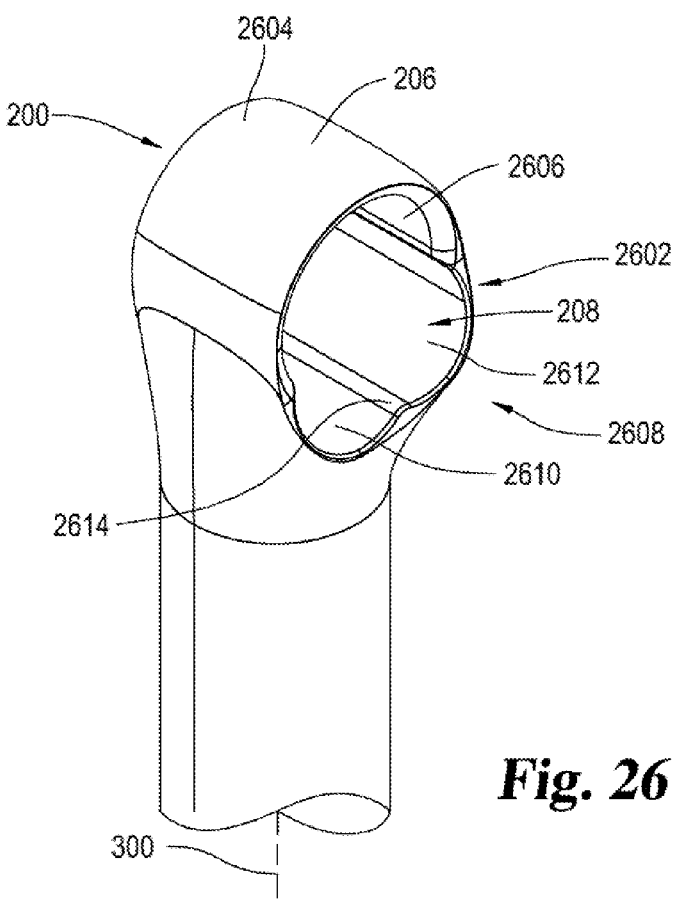
FIG. 26 is a perspective view of the saddle attachment region of the seat post shown in FIG. 2.

FIG. 26 shows a perspective view of the saddle attachment region 200 of the seat post 104. As noted before, the saddle attachment region has the barrel 206 that defines the cavity 208 in which the adjustment assembly is received. The cavity has one or more access openings 2602 through which the cavity can be accessed. In the illustrated embodiment, the cavity has access openings located on opposing sides of the barrel. During assembly, the components of the adjustment assembly are inserted into the cavity via the access openings. The barrel includes a looped portion or cradle engagement wall 2604 that internally has a cradle engagement surface 2606 that defines part of the cavity. The cradle engagement surface in the illustrated example has a semi-cylindrical shape that coincides with the semi-cylindrical shape of the barrel engagement cradle so as to facilitate rotation of the cradle assembly. In one example, when the seat post is made of fiber reinforced materials, such as carbon fiber materials, at least some of the reinforcing fibers of the material are oriented in a looping manner around the barrel. As noted before, fiber reinforced materials typically have greater tensile strength than compressive strength. The adjustment assembly is specifically designed to apply tension to the barrel when the saddle is secured at the desired saddle tilt and position. When the saddle is secured in place, the looped fibers in the cradle engagement wall are placed under tension so as to resist the radially outward expansive force created when the expanders are expanded to press against the cradle assembly. As previously described with respect to FIGS. 6 and 7, the cradle engagement wall of the barrel is received in the alignment groove of the barrel engagement cradle with the raised portions situated on opposite sides so as to minimize lateral movement of the saddle once the saddle is secured.

The barrel of the seat post further includes a keying structure 2608 configured to prevent rotation of the tilt adjustment assembly relative to the barrel once the saddle tilt is locked in place. In the embodiment illustrated in FIG. 26, the keying structure includes first 2610 and second 2612 lobe cavities with a keying ridge 2614 disposed in between. The lobe cavities along with the keying ridge hold the expanders in place such that an interference fit is created between the components of the tilt adjustment assembly when the expanders are expanded to set the saddle tilt and/or position. The resulting interference fit inhibits any further tilting movement of the saddle. The surfaces of fiber reinforced materials, such as carbon fiber, tend to be slippery such that frictional type engagements and the like tend to slip over time. Using this interference fit to lock the saddle tilt addresses these slipping issues associated with grease contaminated parts and/or fiber reinforced materials as well as other types of materials. In the illustrated embodiment, each of the lobe cavities has an inner surface that has a generally semi-cylindrical shape so as to coincide with the curved shape of the barrel contacting walls of the wedges. As mentioned before, the curved shape of the barrel contacting walls of the wedges and the lobe cavities allow the cradle contacting surfaces of the wedge assemblies to be properly aligned with the tilt mechanism contacting surface of the cradle assembly during installation as well as when the saddle tilt is changed. The curved surfaces allow the wedges to rotate within the lobe cavities as the saddle tilt is adjusted.

Figure 27:
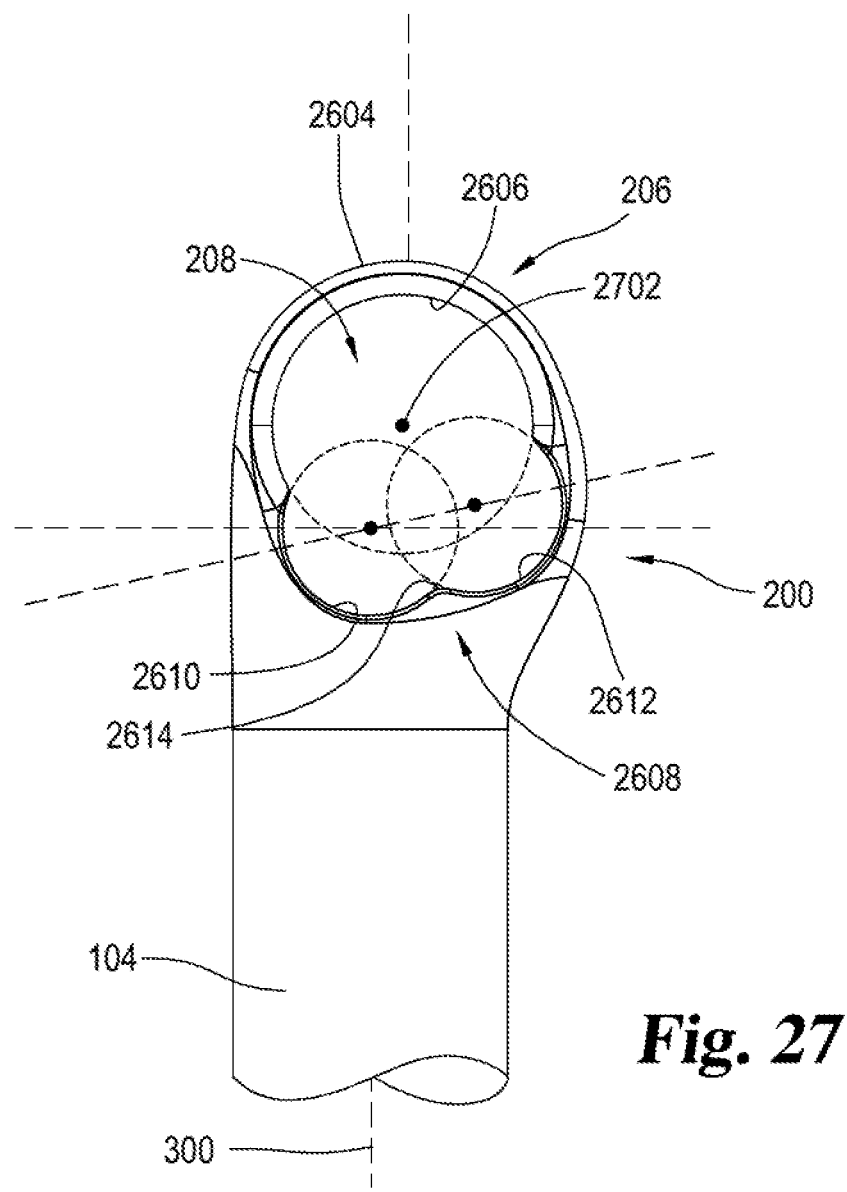
FIG. 27 is a side view of the saddle attachment region of the seat post shown in FIG. 26.

FIG. 27 shows a side view of the saddle attachment region 200 of the seat post 104. In the illustrated embodiment, the keying structure 2608 in the cavity 208 is offset in a circumferential direction relative to the central longitudinal axis 300 of the seat post 104. As can be seen, the keying ridge 2614 between the lobe cavities 2610, 2612 is not aligned with the central longitudinal axis of the seat post. Instead the keying ridge is rotated, relative to a central axis 2702 of the cavity, in a circumferential direction away from the longitudinal axis of the seat post. As a result, when installed, the expanders are located at a circumferentially offset position. Having the expanders and/or keying structure circumferentially offset, among other things, allows the saddle to tilt to a greater degree in one direction (e.g., have the saddle nose tilt farther down); while at the same time, it allows the expanders to be made from identical (or nearly identical) components so that the expanders can be easily swapped or replaced. Typical seat tubes and seat posts do not extend absolutely vertical (relative to ground), but instead, are slightly angled away from vertical. In one example, the expanders and/or keying structure is circumferentially offset to generally compensate for this angle so that the tilt adjustment range relative to horizontal is generally the same in either direction when installed on a bicycle frame with a slanted seat tube and/or seat post.

Assembly and Operation

With the above-described design, a rider and/or mechanic may adjust the saddle height, saddle position, and saddle tilt. To adjust the saddle height, the seat post can be slid into or out of the seat tube until the saddle is at the desired height and then tightened by the seat post clamp. To adjust the saddle position, the rider may loosen one or both screws of the tilt mechanism so as to relieve the pressure on the rails of the saddle, allowing the rider to slide the saddle in a fore or aft direction until the saddle is at the desired saddle position. Once the desired saddle position is achieved, the loosened screws are tightened again so that the rails of the saddle are clamped between the cradles. To adjust the saddle tilt, the rider may expand and contract the expanders in an alternating manner within the barrel. For example, the rider may selectively expand one expander (e.g., wedge assembly) of the tilt mechanism and contract another expander of the tilt mechanism so as to achieve the desired saddle tilt. In one instance, the screw of one of the wedge assemblies is tightened so as to draw the wedges together. As the wedges are drawn together, the wider sections of the ramp portions of the wedges contact the cradle assembly. From the perspective of the cradle assembly, the portion of the wedge assembly contacting the cradle expands vertically or in a radial direction. Simultaneously or sequentially, the screw for the other wedge assembly is loosened so that the wedges spread apart. As a result, the thinner sections of the wedges contact the cradle assembly such that in essence the operative contacting points of the wedge assembly contract in a vertical or radial direction. The resulting uneven forces or pressures applied by the expanders cause the cradle to rotate which in turn changes the tilt of the saddle. This technique facilitates fine tune control and/or adjustment of the saddle tilt. Alternatively or additionally, the mechanic and/or rider can contract both expanders at the same time by loosening the screws in the expanders, manually rotating the saddle to the desired tilt, and then expanding the expanders by retightening the screws to secure the saddle at the desired angle or tilt. It should be recognized that saddle position and saddle tilt can be set at the same time, if so desired.

Definitions And Alternatives

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's dictionaries and Random House dictionaries. As used in the specification and claims, the following definitions apply to the following terms or common variations thereof:

Barrel—includes, but is not limited to, a portion of the seat post defining a cavity in which the cradle and tilt mechanism are received. The cavity of the barrel can have openings on opposing sides, but in other examples, at least one of the openings can be fully or partially enclosed. The walls of the barrel can be continuous or discontinuous. For instance, similar to the eye of a needle, the loop at the end of the seat post forming the wall of barrel is a continuous loop. In other examples, however, the loop can be discontinuous such that the loop includes one or more notches, gaps, and/or cutouts. At least a section of the opening in one example can be generally cylindrical to promote rotation of the cradle. In other examples, the opening of the barrel has neither cylindrical sections nor an overall cylindrical shape, but instead, separate inserts within the barrel shape can have a generally cylindrical shape to promote rotation of the cradle. The barrel in one form can be integrally formed with the seat post, but in other variations, the barrel can be a separate component that is attached to the seat post. The barrel can have a unitary construction formed from one piece, or the barrel can be formed by separate pieces attached together.

Carbon Fiber Material—is a type of fiber reinforced material that includes, but is not limited to, a material of thin, strong crystalline filaments of carbon, used as a strengthening material, such as in resins and ceramics. For example, carbon fiber materials include strong lightweight synthetic fibers made especially by carbonizing a fiber at high temperatures.

Circumferential—pertaining to the circumference; encompassing; encircling; circuitous, the length of a line that goes around something or that makes a circle or other round shape; the outer edge of a shape or area.

Clamped—includes being pressed between two or more parts.

Contract—to decrease in volume or size so that all or part of something becomes smaller in at least one dimension or direction relative to another part and/or component that it engages. For instance, the wedge assemblies described above are considered to contract when the wedges are separated from one another because the operative part of the wedges pressing against the cradle assembly (i.e., the ramp portions) have a thinner profile in a radial or vertical direction. The overall volume of the object can decrease when it contracts, but in other variations, the overall volume does not need to become smaller.

Cradle assembly—includes a structure that is configured to directly or indirectly secure the saddle to the seat post. In one example, the cradle assembly includes a clamping structure that clamps the cradle to the rails of a saddle, if so equipped, but in other variations, the cradle assembly can be secured to the saddle in other manners. The cradle assembly can have a unitary construction or can be made from multiple pieces coupled together. In one example, the cradle assembly includes two components, a barrel engagement cradle and a tilt mechanism engagement cradle, but in other examples, the cradle assembly can include more than two components. The barrel engagement cradle and tilt mechanism engagement cradle are clamped together with the rails of the saddle clamped in between so as to set the saddle position.

Cylindrical—having the form of a shape with generally, straight parallel sides and a circular or oval section.

Expand—to increase in volume or size so that all or part of something becomes bigger in at least one dimension or direction relative to another part and/or component that it engages. For instance, the wedge assemblies described above are considered to expand when the wedges are brought closer to one another because the operative part of the wedges pressing against the cradle assembly (i.e., the ramp portions) have a thicker profile in a radial or vertical direction. The overall volume of the object can increase when it expands, but in other variations, the overall volume does not need to become bigger.

Expander—a part or portion of the tilt mechanism configured to expand and/or contract. Two or more expanders can be separate components, joined together, or integrally formed together as a single unit. In one example, each expander includes a screw that connects two wedges together. The wedges have obliquely angled or slanted contact surfaces. When the screw is tightened, the slanted contact surfaces of the wedges are brought closer together, which in turn causes an expansion in at least one dimension relative to a contacting component. It is contemplated that other devices, besides screws, can connect the wedges together. The expander can include all or in part other types of mechanical devices as well as hydraulic and/or pneumatic devices. For example, the expanders in other examples can include expandable bladders that expand or contact when hydraulic and/or pneumatic pressure is adjusted. The expanders, all or in part, can include electrical and/or electromechanical components, such as electric motors and/or piezoelectric devices, to name just a few examples.

Fiber Reinforced Material—material including fibers of high strength and modulus embedded in or bonded to a matrix with distinct interfaces (boundary) between them.

Interference Fit—includes, but is not limited to, a fit between two parts in which the external dimension of one part slightly exceeds the internal dimension of the part into which it has to fit.

Lateral—of, at, toward, or from the side or sides.

Longitudinal—in the direction extending along the longest dimension; i.e., lengthwise rather than across.

Non-Cylindrical—not having the form of a cylinder

Offset—placed out of line and/or off center.

Rotation—the act or process of moving or turning around a point or axis.

Saddle—includes a seat upon which the rider of a bicycle sits in a straddled position. The saddle for example can include cruiser, comfort, and racing type saddles, to name just a few. The saddle generally includes a shell upon which the rider sits and a carriage or frame that supports the shell. The shell can be made from a variety of materials, such as steel, carbon fiber, leather, foam, vinyl, and/or plastic. The shell can be padded or unpadded. The saddle can also include anatomic saddles that include extra padding, cutouts, and/or other features to adjust the contact points in the pelvic region. Typically, a nose of the saddle is supported by one end of the frame, and a tail of the saddle is supported by the other end of the frame. In one type of construction, the frame includes two or more rails that extend from the nose to the tail of the saddle, but a single rail, such as in the form of an I-beam and other structures without rails can be used in other types of saddles. The rails can be standard sized, smaller than standard sized, or be oversized. The fore-and-aft position of the saddle can be adjusted for comfort as well as to provide maximum leverage for the rider. In one example, the rails of the saddle are slid in the cradle assembly to adjust the saddle position, and once the desired saddle position is achieved, the cradle clamps or otherwise secures the saddle at the desired saddle position.

Saddle Height—includes the elevation of the saddle relative to the bicycle frame. The saddle height is typically the distance measured from the center of the bottom bracket of the frame to the top of the saddle, but the saddle height can be measured using other reference points on the bicycle. For instance the saddle height in other examples can be measured from the top of the saddle to the pedal when the crank is at the 6 o'clock position. Generally speaking, if the saddle height is too low, riding can be difficult, but if it is too high, the rider is unable to obtain the leverage necessary to crank the pedals of the bicycle efficiently.

Saddle Position—includes a fore-and-aft position of the saddle relative to the frame of the bicycle. The saddle position can be adjusted for comfort as well as to provide maximum leverage for the rider. In one example, the rails of the saddle are slid in the cradle assembly to adjust the saddle position, and once the desired saddle position is achieved, the cradle clamps or otherwise secures the saddle at the desired saddle position.

Saddle Tilt—includes generally the angle of the saddle relative to the ground or other flat surface upon which the bicycle rests Improper saddle tilt can lead to poor performance or even injury. In one example, the saddle angle is measured by considering a plane passing through the highest points of the front of the saddle to the rear of the saddle. The saddle tilt can be categorized in generally three ways by the relative position of the nose of the saddle, that is, a positive, negative, or neutral position. With a positive saddle tilt, the nose of the saddle is tilted upwards or farther away from the ground. When the saddle tilt is negative, the nose of the saddle is tilted down, closer to the ground relative to a horizontal or level position of the saddle. Having a neutral tilt, the saddle generally extends horizontal or parallel to the ground or other level surface.

Seat Post—includes a structure that extends from a bicycle frame that attaches the saddle to the frame. In one example, the seat post includes a tube that extends upwards from the bicycle frame to the saddle. At the end of the seat post where the saddle is connected, the seat post can have barrel in which the cradle assembly and tilt mechanism are received. The seat post can have a one-piece design, a two-piece design, or even more pieces. In one example, the seat post uses a one-piece molded design made from carbon fiber. The seat post in one form is adjustable to adjust the saddle height, but in other examples, the seat post can be non-adjustable. For instance, in another form, the seat post includes an integrated seat mast that is integrally formed with the bicycle frame. With an integrated seat mast, the cradle assembly can be incorporated into a cap that slides over the seat mast. Other examples of seat posts include aero type seat posts, quill type seat posts, offset/layback type seat posts, suspension type seat posts, and/or dropper type seat posts. The seat post can be made from a wide variety of materials. The seat post can for example be made of steel, aluminum, titanium, carbon fiber, and/or aluminum wrapped in carbon fiber, to name just a few examples.

Secure—to fix or otherwise fasten so as not to give way, become loose, or be lost.

Tilt Mechanism—includes a device configured to adjust and/or set saddle tilt by applying torque either directly or indirectly to the cradle assembly. In one example, the tilt mechanism includes at least two expanders configured to expand and contract in a reciprocating or alternating manner. In one form, the two expanders are separate components that are not connected together, but it is contemplated that two or more of the expanders can be coupled or otherwise connected together to form a single unit. The expanders in one form directly contact and press against the cradle assembly, but it is envisioned that an intermediate component can be placed between the expanders and the cradle assembly so that the force applied by the expanders is indirectly applied to the cradle assembly without the expanders directly touching the cradle assembly.

Torque—includes a tendency of a force to rotate an object about an axis, fulcrum, and/or pivot. For example, torque can be a measure of a turning force on an object or a twisting force that tends to cause rotation.

It should be noted that the singular forms "a", "an", "the", and the like as used in the description and/or the claims include the plural forms unless expressly discussed otherwise. For example, if the specification and/or claims refer to "a device" or "the device", it includes one or more of such devices.

It should be noted that directional terms, such as "up", "down", "top" "bottom", "fore", "aft", "lateral", "longitudinal", "radial", "circumferential", etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

The above assemblies and components may be made by any materials and processes apparent to be suitable. In particular, the seat post, cradle assembly, and tilt mechanism may include a metal, a polymer, a composite material such as carbon fiber, a fiber reinforced material, or a combination of some or all of these. For example, the seat post may be constructed from carbon fiber and the cradle assembly and tilt mechanism may be constructed from a metal such as aluminum, just to name one non-limiting example.

Additionally, variations on the above-described assemblies, components, and features are contemplated. For example, the present disclosure may also be modified to fit bicycles that have a seat mast instead of a seat tube and seat post. It is also contemplated that the opposing wedges may be coupled to one another by any suitable rotational coupling member such as screw, spindle, or bolt and that the head of the screw/bolt may be received within a counter bore or a counter sink, just to name a few non-limiting examples. The wedge assemblies in the illustrated examples include two wedges, but it should be recognized that the wedge assemblies in other embodiments can include one or more than two wedges. Likewise, while two expanders are shown in the drawings, the tilt mechanism in other embodiments can include three or more expanders. The screw heads for the wedge assemblies are shown to be on opposite sides, but it should be recognized that the screw heads can be located on the same side. While each wedge assembly includes a single screw in the illustrated embodiments, each wedge assembly in other variations can include two or more screws. An expansion/contraction mechanism (e.g., a screw) can be shared between the wedge assemblies so that the wedge assemblies are expanded and contracted in a reciprocal manner at the same time. In the illustrated embodiments, the wedge assemblies are expanded by tightening the screws so that the wedges are brought closer together, and the wedge assemblies are contracted when the screws are loosened. However, the wedge assemblies in other examples can expand and contract in an opposite manner. For example, tightening the screw can cause the wedge assembly to contract, and loosening the screw can cause the wedge assembly to expand in other embodiments. In the illustrated examples, the first to and second expanders are generally identical but are oriented in an opposite fashion when installed together such that the heads of the screws are accessible from opposite sides of the tilt mechanism. In another variation, the screw heads of both expanders can be located on the same side.

The expanders have been described as having the ability to both expand and contract in some of the embodiments. As noted above, this ability to both expand and contract facilitates fine tuning adjustments and readjustments of saddle tilt. In other embodiments, one or more of the expanders is configured to only expand so as to inhibit any saddle tilt readjustments once the saddle tilt is set. For instance, some racing officials and riders may desire to lock the saddle tilt in place once the bicycle passes inspection so as to avoid any changes in saddle tilt during a race. When the expander is only able to expand, the resulting interference fit prevents any saddle tilt changes unless the mechanic and/or rider is willing to destroy the tilt mechanism and/or the seat post. In one example, one or more of the wedges in the wedge assembly incorporate a locknut that only allows the screw to be tightened such that the wedge assembly is only able to expand. It is further contemplated that at least one of the expanders can be replaced by a static component, that is, a component unable to expand and contract; while the other expander is able to at least expand. The static component in this example can be used to set the saddle tilt at a predefined angle by acting as a stop to counter the rotational torque applied by the expander. This static component in one form is a separate component, but in other variations, the static component is integrally formed with the expander and/or the barrel of the seat post.

The seat post assembly in some of the embodiments described above has the ability to set the saddle position and saddle tilt at the same time through the tilt mechanism. In other variations, the saddle tilt and saddle position can be set separately and/or at different times via the same mechanism or different mechanisms. For instance, it is contemplated that the tilt mechanism shown in the drawings can be used to set the saddle tilt, and a different mechanism, such as a screw, ratchet, etc., can be used to set the saddle position through a frictional fit or an interference fit.

In the embodiments described above, the barrel engagement and tilt mechanism engagement cradles each have a cavity to reduce the weight of the adjustment assembly. However, the cradles in other examples may or may not have the cavity. In some instances, the cavity can be filled with a second material different than that used to form the cradle. For example, the second material can have a lower specific weight than that of the cradle material and/or be used to dampen vibrations.

As discussed above with respect to FIGS. 26 and 27, the lobe cavities of the keying structure are offset in a circumferential direction relative to the central axis of the seat post so as to facilitate greater saddle tilt in one direction while using wedge assemblies of the same size so as to promote interchangeability between the wedge assemblies. It is contemplated that in other variations the keying structure is not offset in a circumferential direction so that the saddle is able to tilt to the same degree in both rotational directions. In some of the illustrated embodiments, the expanders are configured the same (i.e., identical or nearly identical) so as to be interchangeable. The wedge assemblies in other embodiments can be different. For example, the expanders can be differently sized from one another so as to provide a greater rotational freedom in one direction or not.

The publications and patents discussed herein, if any, are provided solely for their disclosure prior to the filing date of the present application. Nothing herein is to be construed as an admission that the present invention is not entitled to antedate such publications and patents by virtue of prior invention. Further, the dates of publication provided may be different from the actual publication dates, which may need to be independently confirmed.

While an exemplary construct and components have been illustrated and described in detail in the drawings and foregoing description, the same is to be considered as illustrative and not restrictive in character, it being understood that the preferred embodiment has been described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

The invention claimed is:

1. An apparatus, comprising:
    a seat post having a barrel, the barrel defining a cavity with a cradle engagement wall, the cavity having a first lobe cavity and a second lobe cavity opening towards the cradle engagement wall;
    a cradle assembly received in the cavity of the barrel to secure a saddle to the seat post; and
    a tilt mechanism received in the cavity of the barrel for setting saddle tilt, the tilt mechanism including
        a first expander received in the first lobe cavity,
        a second expander received in the second lobe cavity, and
        wherein the first expander and the second expander are configured to press the cradle assembly against the cradle engagement wall to set the saddle tilt of the saddle.

2. The apparatus of claim 1, wherein the first expander is positioned to apply a force to the cradle assembly that is offset relative to an axis about which the cradle assembly rotates.

3. The apparatus of claim 1, wherein the first and second expanders are configured to expand and contract in a complementary manner to adjust the saddle tilt.

4. The apparatus of claim 1, wherein the tilt mechanism creates an interference fit with the cradle assembly and the barrel when the saddle tilt is set.

5. The apparatus of claim 1, wherein the first expander includes a wedge assembly, the wedge assembly including at least two wedges connected together with an adjustment mechanism configured to adjust the relative positions of the at least two wedges.

6. The apparatus of claim 1, wherein the cradle assembly is configured to set saddle position of the saddle when the first expander is expanded.

7. The apparatus of claim 1, further comprising:
    the cradle assembly including
        a barrel engagement cradle contacting the barrel, and
        a tilt mechanism engagement cradle contacting the tilt mechanism; and
    wherein the tilt mechanism is configured to apply pressure to the tilt mechanism engagement cradle to clamp one or more rails of the saddle between the barrel engagement cradle and the tilt mechanism engagement cradle.

8. The apparatus of claim 7, wherein the barrel engagement cradle includes a tongue and the tilt mechanism engagement cradle includes a groove in which the tongue is received for aligning the barrel engagement cradle with the tilt mechanism engagement cradle.

9. The apparatus of claim 1, wherein the cradle assembly and the tilt mechanism have opposing ramp portions arranged to slidably engage with one another.

10. The apparatus of claim 9, wherein the opposing ramp portions have an angle from 30 to 35 degrees.

11. The apparatus of claim 1, wherein the cradle assembly has an alignment structure that inhibits lateral movement of the cradle assembly relative to the seat post while allowing rotational movement of the cradle assembly.

12. The apparatus of claim 11, wherein the alignment structure includes a semi-circular groove defined in the cradle assembly.

13. The apparatus of claim 1, wherein:
    at least the barrel of the seat post is made of fiber reinforced material wrapped around the barrel; and
    the first and second expanders places the fiber reinforced material of the barrel under tension when the saddle tilt is set.

14. The apparatus as in claim 13, wherein the fiber reinforced material includes carbon fiber material.

15. The apparatus of claim 1, further comprising a keying structure configured to prevent rotation of the tilt mechanism relative to the barrel.

16. The apparatus of claim 15, wherein the keying structure is offset in a circumferential direction relative to a longitudinal axis of the seat post.

17. The apparatus of claim 15, wherein the keying structure includes a lobe cavity defined in the barrel in which the first expander is received.

18. The apparatus of claim 17, wherein the first expander and the lobe cavity have curved contacting surfaces configured to facilitate rotation of the first expander within the lobe cavity.

19. A method, comprising:
    coupling a saddle to a cradle assembly, wherein the cradle assembly is received inside a cavity of a barrel of a seat post;
    wherein the cradle assembly includes a barrel engagement cradle and a tilt mechanism engagement cradle;
    wherein the saddle includes one or more rails;
    wherein said coupling includes positioning at least a portion of the rails of the saddle between the barrel engagement cradle and the tilt mechanism engagement cradle;
    positioning a first expander and a second expander at a position in the cavity to contact the tilt mechanism engagement cradle, wherein the first expander and the second expander extend in a side by side manner within the cavity; and
    changing saddle tilt of the saddle by expanding the first expander and contracting the second expander inside the barrel to exert a torque on the cradle assembly.

20. The method of claim 19, further comprising:
    wherein the cavity includes a first lobe cavity and a second lobe cavity with a keying ridge disposed between the first lobe cavity and the second lobe cavity;
    inserting the first expander into the first lobe cavity; and
    inserting the second expander into the second lobe cavity.

21. The method of claim 19, wherein:
    the first expander includes at least two wedges connected together with a screw configured to adjust the relative positions of the wedges;
    the wedges have opposing ramp portions contacting the tilt mechanism engagement cradle; and
    said changing the saddle tilt includes tightening the screw to bring the wedges closer together.

22. The method of claim 19, further comprising setting saddle position by expanding the first expander so that the barrel engagement cradle and the tilt mechanism engagement cradle of the cradle assembly clamp to the rails of the saddle.

23. The method of claim 19, wherein said changing the saddle tilt includes:
    positioning the saddle at the desired saddle tilt; and expanding the first expander while holding the saddle at the desired saddle tilt.

24. An apparatus, comprising:
a seat post having a barrel;
a cradle assembly received in the barrel to secure a saddle to the seat post, the cradle assembly including
  a barrel engagement cradle contacting the barrel, wherein the barrel engagement cradle includes a tongue, and
  a tilt mechanism engagement cradle including a groove in which the tongue is received for aligning the barrel engagement cradle with the tilt mechanism engagement cradle;
a tilt mechanism received in the barrel for setting saddle tilt, the tilt mechanism having at least one expander configured to at least expand, wherein the expander is positioned in the barrel to exert a torque on the cradle assembly during expansion that causes the cradle assembly to rotate; and
wherein the tilt mechanism contacts the tilt mechanism engagement cradle to apply pressure to the tilt mechanism engagement cradle to clamp one or more rails of the saddle between the barrel engagement cradle and the tilt mechanism engagement cradle.

25. The apparatus of claim 24, wherein the barrel engagement cradle includes a groove configured to engage the barrel to inhibit lateral movement of the cradle assembly.

26. The apparatus of claim 24, wherein the expander includes a wedge assembly, the wedge assembly including at least two wedges connected together with an adjustment mechanism configured to adjust the relative positions of the wedges, wherein the wedges each have a ramp portion that contacts the tilt mechanism engagement cradle.

27. The apparatus of claim 24, wherein the barrel defines a lobe cavity in which the expander is positioned to limit movement of the expander relative to the barrel.

28. The apparatus of claim 24, wherein:
at least the barrel of the seat post is made of fiber reinforced material wrapped around the barrel; and
the expander places the fiber reinforced material of the barrel under tension when the saddle tilt is set.

29. The apparatus of claim 24, wherein the tilt mechanism includes at least two expanders positioned in the barrel to apply counteracting torques to the cradle assembly.

30. An apparatus, comprising:
a seat post having a barrel and a seat tube extending along a longitudinal axis, the barrel defining a cavity with a cradle engagement wall;
a cradle assembly received in the cavity of the barrel to secure a saddle to the seat post, the cradle assembly including
  a barrel engagement cradle contacting the cradle engagement wall,
  a tilt mechanism engagement cradle, and
  wherein the barrel engagement cradle and the tilt mechanism engagement cradle together define one or more rail receiving recesses configured to engage a portion of a rail of the saddle; and
a tilt mechanism received in the cavity of the barrel for setting saddle tilt, the tilt mechanism including
  a first expander received in the cavity of the barrel, wherein the first expander extends in the cavity transversely relative to the longitudinal axis,
  a second expander received in the cavity, wherein the first expander extends inside the cavity transversely relative to the longitudinal axis,
  wherein the first expander and the second expander press against the tilt mechanism engagement cradle, and
  wherein the first expander and the second expander through the tilt mechanism engagement cradle are configured to press the barrel engagement cradle against the cradle engagement wall to set the saddle tilt of the saddle.

31. The apparatus of claim 30, wherein the barrel engagement cradle includes a groove configured to engage the barrel to inhibit lateral movement of the cradle assembly.

32. The apparatus of claim 30, wherein the first expander includes a wedge assembly, the wedge assembly including at least two wedges connected together with an adjustment mechanism configured to adjust the relative positions of the wedges, wherein the wedges each have a ramp portion that contacts the tilt mechanism engagement cradle.

33. The apparatus of claim 30, wherein the barrel defines:
a first lobe cavity in which the first expander is received;
a second lobe cavity in which the second expander is received; and
a keying ridge disposed between the first lobe cavity and the second lobe cavity.

34. The apparatus of claim 30, wherein:
at least the barrel of the seat post is made of fiber reinforced material wrapped around the barrel; and
the first expander places the fiber reinforced material of the barrel under tension when the saddle tilt is set.

* * * * *